US009970544B2

(12) United States Patent
Yamasaki et al.

(10) Patent No.: US 9,970,544 B2
(45) Date of Patent: May 15, 2018

(54) CONTROL DEVICE OF ENGINE

(71) Applicant: Mazda Motor Corporation, Aki-gun, Hiroshima (JP)

(72) Inventors: Atsushi Yamasaki, Hiroshima (JP); Kyohei Ike, Kure (JP); Yoshimitsu Fukuda, Higashihiroshima (JP); Toshiyuki Yamaguchi, Hiroshima (JP); Kenji Tanaka, Hiroshima (JP); Chikako Ohisa, Aki-gun (JP); Takeatsu Ito, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 348 days.

(21) Appl. No.: 14/731,158

(22) Filed: Jun. 4, 2015

(65) Prior Publication Data
US 2016/0033039 A1 Feb. 4, 2016

(30) Foreign Application Priority Data

Aug. 1, 2014 (JP) ................................. 2014-157480

(51) Int. Cl.
*B60W 10/02* (2006.01)
*B60W 10/06* (2006.01)
(Continued)

(52) U.S. Cl.
CPC .......... *F16H 63/502* (2013.01); *F16H 59/70* (2013.01); *F16H 2059/6807* (2013.01); *F16H 2306/54* (2013.01)

(58) Field of Classification Search
CPC ............... F16H 59/70; F16H 63/502; F16H 2059/6807; F16H 2306/54; B60W 10/02; B60W 10/06; B60W 10/11; B60W 30/19
See application file for complete search history.

(56) References Cited

U.S. PATENT DOCUMENTS

| 4,967,355 A | 10/1990 | Iwatsuki et al. |
| 6,190,286 B1 | 2/2001 | Ito et al. |
| (Continued) | | |

FOREIGN PATENT DOCUMENTS

| JP | H64015560 A | 1/1989 |
| JP | H03151533 A | 6/1991 |
| (Continued) | | |

OTHER PUBLICATIONS

Japan Patent Office, Office Action Issued in Japanese Application No. 2014-157480, dated Jul. 11, 2017, 3 pages.

*Primary Examiner* — Edwin A Young
(74) *Attorney, Agent, or Firm* — Alleman Hall Creasman & Tuttle LLP

(57) ABSTRACT

An engine control device to be mounted on a vehicle is provided. The control device includes a transmission state determining module for determining a connection between a stepped transmission and an engine, determining that a gear shift has started if the connection is disengaged from a connected state, and determining that the gear shift has finished if the connection is resumed, a gear position estimating module for estimating a gear position when the gear shift is determined to have started, a target engine speed specifying module for specifying a target engine speed based on the estimated gear position, and a speed control module for controlling an engine speed to the target engine speed when the gear shift is determined to have started.

9 Claims, 6 Drawing Sheets

(51) Int. Cl.
*B60W 10/11* (2012.01)
*F16H 63/50* (2006.01)
*F16H 59/70* (2006.01)
F16H 59/68 (2006.01)

(56) References Cited

U.S. PATENT DOCUMENTS

| | | | |
|---|---|---|---|
| 2001/0020206 A1* | 9/2001 | Nishimura | F16H 61/16 701/54 |
| 2004/0214687 A1* | 10/2004 | Morisawa | B60W 10/02 477/109 |
| 2008/0255738 A1 | 10/2008 | Murayama et al. | |
| 2008/0287252 A1 | 11/2008 | Kaya et al. | |
| 2009/0326771 A1* | 12/2009 | Murayama | F16H 61/0403 701/54 |
| 2010/0217496 A1 | 8/2010 | Kaya et al. | |
| 2010/0286885 A1* | 11/2010 | Guggolz | B60W 10/06 701/70 |

FOREIGN PATENT DOCUMENTS

| | | |
|---|---|---|
| JP | H0968063 A | 3/1997 |
| JP | H968063 A | 3/1997 |
| JP | 2000170896 A | 6/2000 |
| JP | 2001280473 A | 10/2001 |
| JP | 2002039360 A | 2/2002 |
| JP | 2006160238 A | 6/2006 |
| JP | 2007120585 A | 5/2007 |
| JP | 2008267144 A | 11/2008 |

* cited by examiner

CONTROL DEVICE OF ENGINE

BACKGROUND

The present invention relates to a control device of an engine connected with a stepped transmission via a clutch.

Conventionally, it is known to perform a so-called shift assist control so as to reduce a shock that occurs during a gear shift, namely a shift shock, in a vehicle having an engine connected with a stepped transmission via a clutch.

Specifically, in the gear shift, generally the stepped transmission is disconnected from the engine by the clutch, then the gear position is changed, and the stepped transmission is connected with the engine again. If the rotational speed of the stepped transmission is not synchronized with the speed of the engine when reconnecting, vibration (shift shock) occurs in the vehicle. For this reason, a control is performed to reduce the shift shock. For example, JPH09-068063A discloses such a control.

Specifically, JPH09-068063A discloses a control device for estimating, when the transmission is disconnected from the engine by the clutch, a gear position to be changed to when the gear shift has finished, based on a gear position immediately before the disconnection, and controlling a throttle valve to adjust the engine speed to the speed corresponding to the estimated gear position.

According to the device of JPH09-068063A, since the engine speed is controlled to the speed corresponding to the estimated gear position, a difference between the rotational speed of the transmission and the engine speed when they are reconnected can be small, reducing the shift shock.

However, since this device estimates the gear position to be changed to when the gear shift has finished, and maintains the engine speed at the speed corresponding to the estimated gear position, the engine speed may be maintained at a speed different from the vehicle operator's intention, causing discomfort to the vehicle operator. For example, in a case where the gear position which the vehicle operator inputs in the gear shift is different from the predicted gear position, or a case where the vehicle operator does not reconnect the transmission with the engine so as to stop the vehicle, the engine speed is maintained at a different value from the vehicle operator's intension. Therefore, a situation occurs where the vehicle operator feels uncomfortable.

SUMMARY

The present invention is made in view of the above situations and aims to provide an engine control device, which can avoid causing discomfort to a vehicle operator while reducing a shift shock.

According to an aspect of the present invention, an engine control device to be mounted on a vehicle is provided. The vehicle includes a stepped transmission, an engine, and a clutch for connecting the stepped transmission with the engine and disconnecting the stepped transmission from the engine. The control device includes a transmission state determining module, a gear position estimating module, a target engine speed specifying module, and a speed control module. The transmission state determining module determines a connection between the stepped transmission and the engine, determines that a gear shift has started if the connection between the stepped transmission and the engine is disengaged from a connected state, and determines that the gear shift has finished if the connection between the stepped transmission and the engine is resumed. The gear position estimating module estimates a gear position when the gear shift is determined to have started by the transmission state determining module. The target engine speed specifying module specifies a target engine speed that synchronizes with a rotational speed of the stepped transmission when the gear shift has finished, based on the gear position estimated by the gear position estimating module. The speed control module controls an engine speed to become the target engine speed when the gear shift is determined to have started by the transmission state determining module. The speed control module stops a control of the engine speed when the transmission state determining module determines that the gear shift has finished or a specific period is lapsed since the transmission state determining module determines that the gear shift has started, and the specific period is designed to be longer as a speed of the vehicle when the transmission state determining module determines that the gear shift has started is higher.

According to this configuration, the target value of the engine speed that synchronizes with the rotational speed of the stepped transmission when the gear shift has finished is specified based on the gear shift starting gear position, and during the gear shift, the engine speed is controlled to become the target value. Therefore, the difference between the rotational speed of the transmission and the engine speed can be reduced to be small when the gear shift has finished, and occurrence of a shift shock caused by the speed difference can be reduced. Further, when the specific period has lapsed since the gear shift was started, the control of the engine speed is stopped, and thus, the engine speed can be inhibited from changing differently from a vehicle operator's intension and a situation where the vehicle operator feels uncomfortable can be avoided.

Especially, in the above configuration, since the specific period is designed to be longer as the vehicle speed when the gear shift has started is higher, the shift shock can more surely be reduced to be small without causing the vehicle operator to feel uncomfortable.

Specifically, in a gear shift, as the vehicle speed is higher and, accordingly, as the engine speed is higher when the gear shift has started, a difference between the engine speed at the gear shift start timing and the engine speed synchronizing with the rotational speed of the transmission when the gear shift has finished (after changing the gear position) becomes larger. Therefore, a required period of time for the engine speed to change to the engine speed synchronizing with the rotational speed of the transmission generally becomes longer. On the other hand, in the above configuration, the specific period is designed to be longer and the period of time for performing the engine speed control is ensured to be longer as the vehicle speed is higher as above. Therefore, the engine speed can be matched more surely with the synchronization speed to reduce the shift shock to be small.

Here, generally, a transmission provided in a vehicle is designed to have a larger difference in synchronization speed between gear positions as the gear positions are lower, when a vehicle speed is constant. Therefore, the specific period is preferably designed to be longer as the gear position estimated by the gear position estimating module is lower, while a vehicle speed is constant.

Thus, the specific period, in other words, a period of time for controlling the engine speed, is ensured to be longer as the gear position when the gear shift has started is lower and as the difference in the synchronization speed before and after the gear shift is larger. Therefore, the engine speed can be controlled to become the synchronization speed when the gear shift has finished more surely, so the shift shock is reduced to be small.

DETAILED DESCRIPTION OF EMBODIMENT

Hereinafter, a control device 1 of an engine 2 according to one embodiment of the present invention is described with reference to the accompanying drawings.

(1) Overall Configuration

Figure 1:
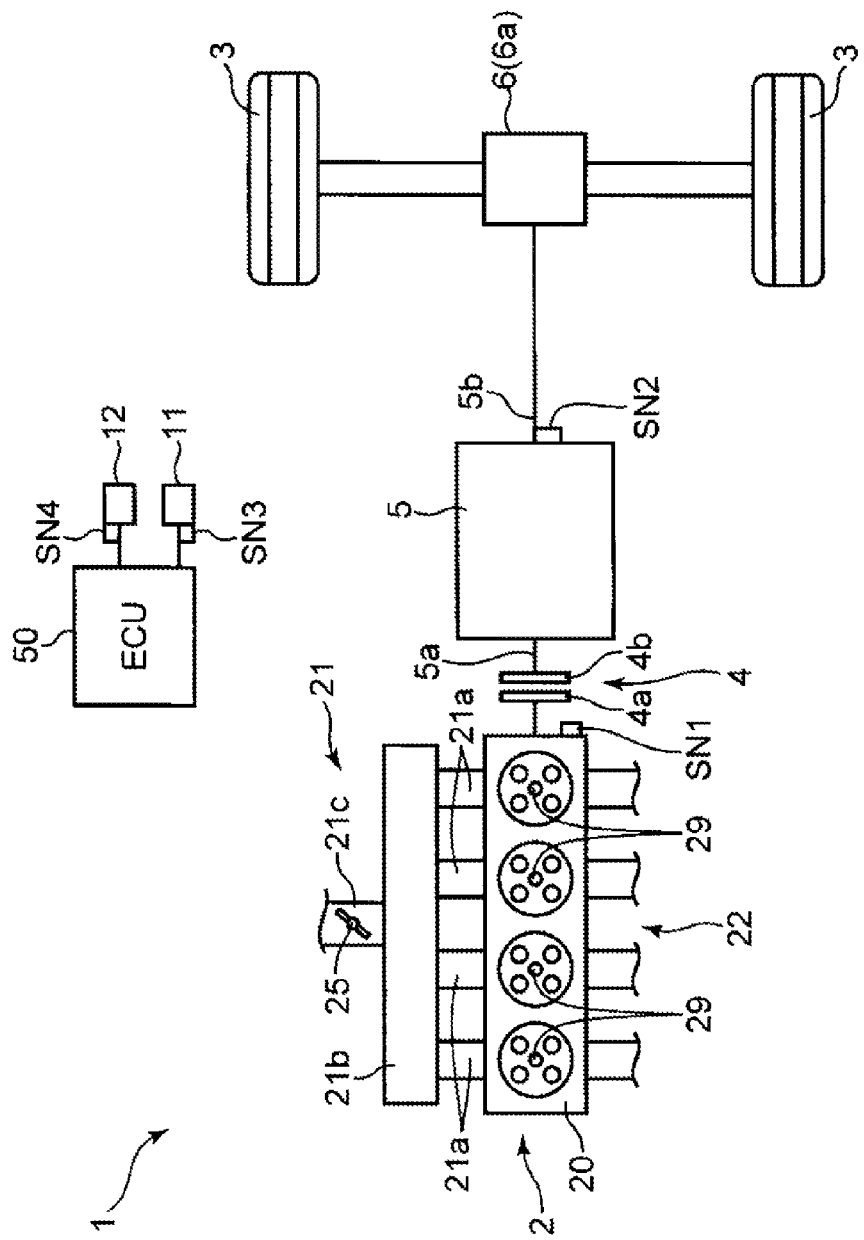
FIG. 1 is a schematic view illustrating a vehicle to which a control device of an engine according to one embodiment of the present invention is applied.

FIG. 1 is a schematic view illustrating a vehicle to which the control device 1 of the engine 2 is applied.

Figure 2:
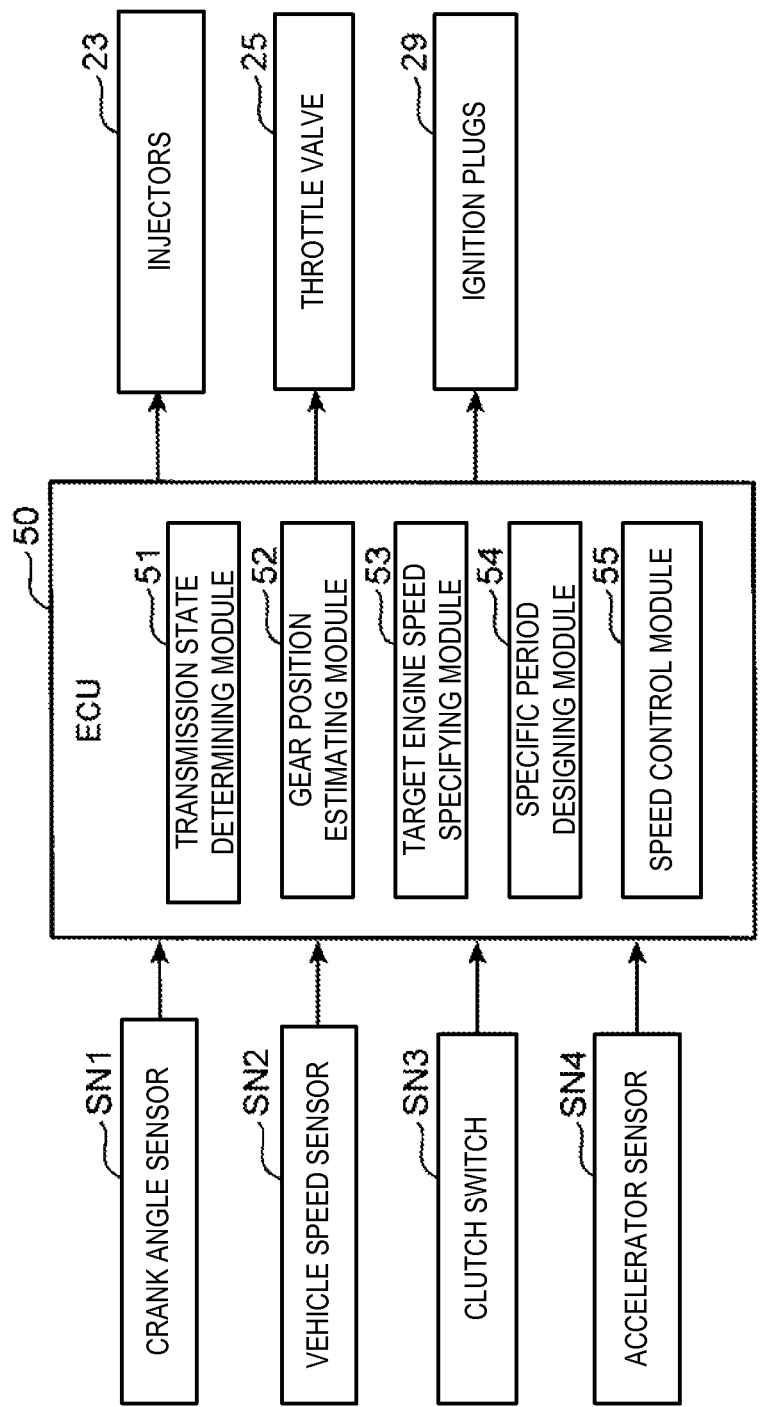
FIG. 2 is a block diagram illustrating a control system of the control device of the engine according to the embodiment of the present invention.

The engine 2 illustrated in FIG. 1 is mounted in the vehicle to serve as a drive source for travelling, and is an inline four-cylinder direct injection engine. As illustrated in FIG. 1, the engine 2 includes an engine body 20 formed with a plurality of cylinders, an intake passage 21 for introducing air (intake air) into the engine body 20, and an exhaust passage 22 for discharging exhaust gas that is generated inside the engine body 20. Further, each of the cylinders in the engine body 20 is provided with an injector 23 (see FIG. 2) for injecting fuel into the cylinder and an ignition plug 29 for causing mixture gas to combust by supplying ignition energy to the mixture gas by means of spark discharge. The mixture gas contains the fuel injected from the injector 23 and air.

The intake passage 21 has four independent intake passages 21a communicating with the cylinders, respectively, a single surge tank 21b connected with upstream ends of the independent intake passages 21a, and a single intake pipe 21c extending upstream from the surge tank 21b. A throttle valve 25 for opening and closing to adjust a flow rate of the intake air introduced into the engine body 20 is provided in an intermediate portion of the intake pipe 21c.

A clutch 4, a transmission (stepped transmission) 5, and a differential 6 are interposed between the engine 2 configured as above and left and right drive wheels 3, and the drive force generated by the engine 2 is transmitted to the drive wheels 3 via these components.

The transmission 5 is a stepped transmission. In this embodiment, a five-stepped transmission having five forward gear positions is adopted. Specifically, the transmission 5 has an input shaft 5a that receives the drive force of the engine 2, and an output shaft 5b for outputting the drive force toward the drive wheels 3. The transmission 5 also has five gears with different gear ratios from each other between the input and output shafts 5a and 5b. Note that the transmission 5 is also provided with a reverse gear position. The transmission 5 is a manual transmission, and a vehicle operator controls a gear shift lever (not illustrated) to change the gear position.

The clutch 4 disconnects the engine 2 from the transmission 5. The clutch 4 has a clutch plate 4a coupled to an output shaft of the engine 2 and a clutch plate 4b connected with the input shaft 5a of the transmission 5, and changes the connection between the engine 2 and the transmission 5 by switching the state of the clutch plates 4a and 4b between a mutual pressure-contact state and a separated state. The clutch 4 changes the connection between the engine 2 and the transmission 5 according to a control of a clutch pedal 11 by the vehicle operator. Specifically, when the clutch pedal 11 is depressed by a stepping operation (clutch cutoff operation), the clutch plates 4a and 4b are separated so that the connection between the engine 2 and the transmission 5 is disengaged, whereas when the clutch pedal 11 is released, the clutch plates 4a and 4b are pressured to be in contact with each other so as to bring the engine 2 and the transmission 5 into a connected state.

The differential 6 distributes the drive force transmitted from the transmission 5 to the left and right drive wheels 3. The differential 6 includes a final decelerator 6a, and the drive force transmitted from the transmission 5 is reduced by the final decelerator 6a and then transmitted to the drive wheels 3.

Moreover, an alternator which is driven by the engine 2 to generate electric power is coupled to the engine 2 via a wrapping transmission member, such as a belt.

(2) Control System (2-1) Outline

A control system of the engine 2 is described. In this embodiment, various components of the engine are integrally controlled by an engine control unit (ECU) 50 illustrated in FIGS. 1 and 2. As is well known, the ECU 50 is a microprocessor comprised of a CPU, a ROM, and a RAM.

The engine 2 and the vehicle are provided with a plurality of sensors for detecting states of the various components, and information from these sensors is inputted into the ECU 50.

For example, the engine body 20 is provided with a crank angle sensor SN1 for detecting a speed of the engine. Specifically, the crank angle sensor SN1 detects a rotational angle and a rotational speed of a crankshaft, and the engine speed is obtained based on the rotational speed of the crankshaft detected by the crank angle sensor SN1.

The vehicle is provided with a vehicle speed sensor SN2 for detecting a vehicle speed. Specifically, the vehicle speed sensor SN2 detects a speed of the output shaft 5b of the transmission 5, and a speed of the drive wheels 3 and a vehicle speed are obtained based on the speed of the output shaft 5b of the transmission 5 detected by the vehicle speed sensor SN2.

Moreover, the vehicle is also provided with a clutch switch SN3 for detecting the stepping operation on the clutch pedal 11, and an accelerator sensor SN4 for detecting an opening of an acceleration pedal 12 (accelerator opening) which is controlled by the vehicle operator. In this embodiment, the clutch switch SN3 determines whether the depressed amount of the clutch pedal 11 is larger than a predetermined amount, and it outputs a predetermined signal when the depressed amount exceeds the predetermined amount.

The ECU 50 is electrically connected with the sensors SN1 to SN4 and acquires the various kinds of information described above (engine speed, vehicle speed, depressed state of clutch pedal, and accelerator opening) based on the signals received from the sensors.

The ECU 50 controls the various components of the vehicle while performing various determinations and operations based on the input signals from the sensors SN1 to SN4. For example, the ECU 50 is electrically connected with the injectors 23, the throttle valve 25, and the ignition plugs 29, and outputs control signals to these components to drive them based on the results of the operations, etc.

(2-2) Description of Various Components and Modules Relating to Shift Assist Control The ECU 50 has characteristic functional elements related to a shift assist control for reducing a shift shock which may occur during a gear shift, and the characteristic functional elements include a transmission state determining module 51, a gear position estimating module 52, a target engine speed specifying module 53, a specific period designing module 54, and a speed control module 55.

The transmission state determining module 51 determines whether the engine 2 and the transmission 5 are connected or disconnected and, based on the determination result, also determines whether a gear shift is being performed. In this embodiment, the transmission state determining module 51 performs the above determinations based on the detection signal from the clutch switch SN3.

Specifically, if the predetermined signal is outputted from the clutch switch SN3 and it is detected by the clutch switch SN3 that the clutch pedal 11 is depressed by more than the predetermined amount, the transmission state determining module 51 determines that the engine 2 and the transmission 5 are disconnected. On the other hand, if the predetermined signal is not outputted from the clutch switch SN3, the transmission state determining module 51 determines that the engine 2 and the transmission 5 are in the connected state. Further, if the transmission state determining module 51 determines that the connection between the engine 2 and the transmission 5 is disengaged, it concludes that the gear shift has started, and if the transmission state determining module 51 determines that the connection between the engine 2 and the transmission 5 has been resumed, it concludes that the gear shift has finished. Hereinafter, a point in time at which the transmission state determining module 51 determines that the gear shift has started may simply be referred to as the gear shift start timing, and a point in time at which the transmission state determining module 51 determines that the gear shift has finished may simply be referred to as the gear shift end timing.

The gear position estimating module 52 estimates the gear position at the gear shift start timing (hereinafter, suitably referred to as the gear shift starting gear position). The gear position estimating module 52 estimates the gear shift starting gear position based on an engine speed NE and a vehicle speed Vsp at the gear shift start timing.

Figure 3:
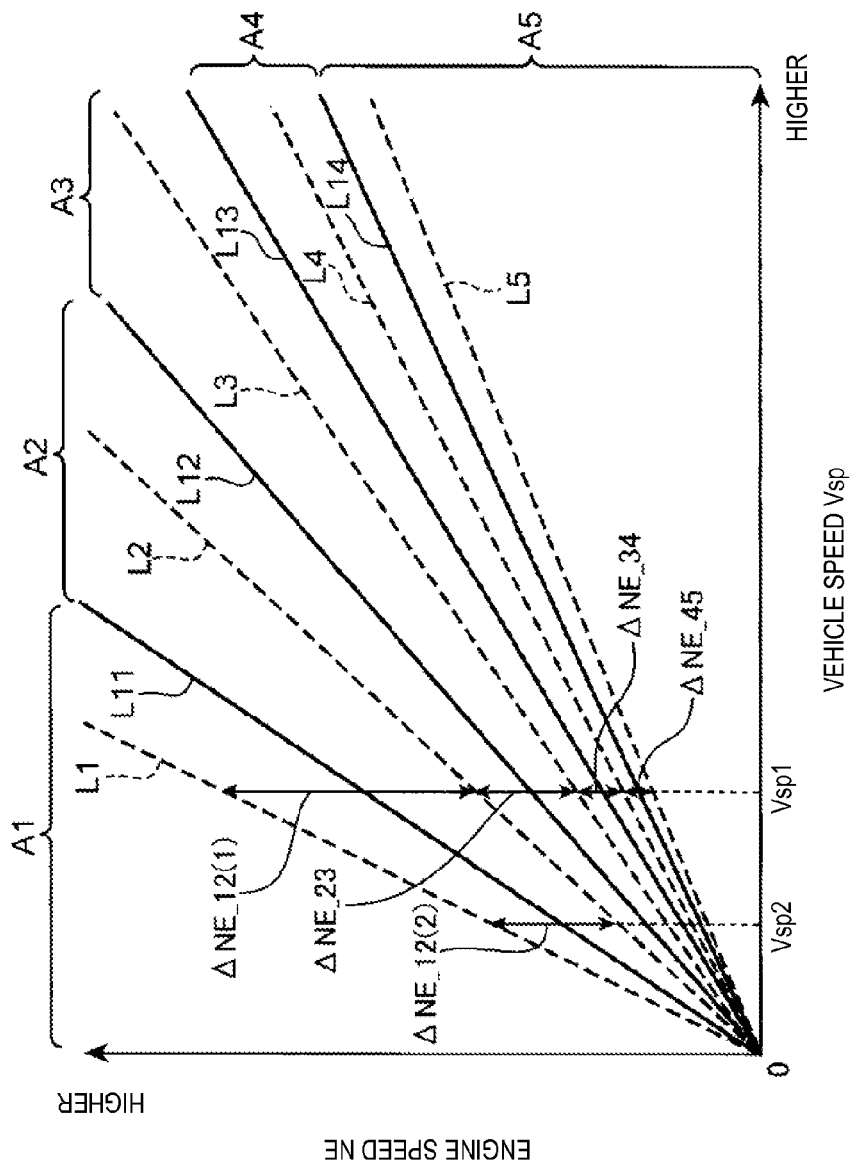
FIG. 3 is a chart illustrating relationships between an engine speed and a vehicle speed at predetermined gear positions, respectively.

In this embodiment, the gear position estimating module 52 determines a range under which the vehicle speed Vsp and the engine speed NE at the gear shift start timing fall, among predetermined first to fifth ranges A1 to A5 designed as illustrated in FIG. 3. The gear shift starting gear position is estimated to be a first gear position if the determined range is the first range A1, a second gear position if the determined range is the second range A2, a third gear position if the determined range is the third range A3, a fourth gear position if the determined range is the fourth range A4, and a fifth gear position if the determined range is the fifth range A5.

Each of the ranges A1 to A5 is designed with reference to a reference synchronization speed at the corresponding gear position by taking a predetermined offset amount from the reference synchronization speed into consideration. Here, the reference synchronization speed is a speed of the engine 2 synchronizing with the rotational speed of the transmission 5 in a reference state where the drive wheels are not worn and do not slip and a resistance/mechanical loss does not occur at the clutch 4, the transmission 5, etc. A reference synchronization speed $NEs\_i$ of each gear position (i: gear position, $i=1$ to 5) is defined by $NEs\_i = Vsp \times FGR \times KGEAR\_i \times K$ (K is a constant), wherein Vsp is the vehicle speed, $KGEAR\_i$ ($i=1$ to 5) is the gear ratio at each gear position, and FGR is a deceleration ratio of the final decelerator 6a. Hereinafter, this equation is suitably referred to as Equation A. The lines L1 to L5 in FIG. 3 indicate the reference synchronization speeds at the first to fifth gear positions, respectively.

The ranges A1 to A5 are designed to cover both the lower and higher sides of the lines L1 to L5 of the reference synchronization speeds, centering on the lines L1 to L5, respectively. In this embodiment, boundary lines L11 to L14 are formed such that each of them passes through the middle of two adjacent reference synchronization speed lines (a middle value between two adjacent lines in terms of engine speed at the same vehicle speed). Specifically, each of the lines L11 to L14 is formed such that its inclination corresponds to an average value of inclinations of the adjacent reference synchronization speed lines, and is derived by assigning an average value of gear ratios at two adjacent gear positions into the gear ratio in Equation A. The second to fourth ranges A2 to A4 are designed to be sandwiched by the lines L11 and L12, L12 and L13, and L13 and L14, respectively. Moreover, the first range A1 is designed to be the entire range on the lower vehicle speed side of the central line L11 formed between the reference synchronization speed line L1 at the first gear position and the reference synchronization speed line L2 at the second gear position. Furthermore, the fifth range A5 is designed to be the entire range on the higher vehicle speed side of the central line L14 formed between the reference synchronization speed line L4 at the fourth gear position and the reference synchronization speed line L5 at the fifth gear position.

Thus, in this embodiment, all the engine speeds and all the vehicle speeds are assigned to one of the gear position ranges, and the gear shift starting gear position is surely estimated to be one of the first to fifth gear positions by the gear position estimating module 52. Note that in a normal state where the clutch 4 is not slipping (i.e., not in transition between engaged states) and the engine 2 is firmly connected with the transmission 5, the engine speed and the vehicle speed are values that are substantially on one of the reference synchronization speed lines L1 to L5.

The target engine speed specifying module 53 specifies, as a target engine speed, the engine speed which synchronizes with the rotational speed of the transmission 5 (the speed matching with the rotational speed of the input shaft 5a of the transmission 5) when the gear shift has finished, based on the gear shift starting gear position estimated by the gear position estimating module 52. Specifically, the target engine speed specifying module 53 first estimates the gear position to be changed to when the gear shift has finished, based on the gear shift starting gear position. In this embodiment, the shift assist control is performed mainly so as to reduce the shift shock which occurs when shifting up, and the target engine speed specifying module 53 estimates the gear position to be changed to when the gear shift has finished (shifted gear position) at one level higher than the gear shift starting gear position. For example, if the gear shift starting gear position is the second gear position, the third gear position is estimated to be the shifted gear position. Next, from the reference synchronization speed line of the estimated shifted gear position, the target engine speed specifying module 53 extracts a value corresponding to the vehicle speed at the gear shift start timing (hereinafter, suitably referred to as the gear shift starting vehicle speed), and specifies this value as the target engine speed. Specifically, the target engine speed specifying module 53 specifies the engine speed derived by assigning the estimated shifted gear position and the vehicle speed into Equation A, as the target engine speed.

The speed control module 55 controls the engine speed to the target engine speed specified by the target engine speed specifying module 53. In this embodiment, the speed control module 55 controls the engine speed by changing the opening of the throttle valve 25, a fuel injection amount from the injector 23, and an ignition timing. A specific routine of this control of the engine speed is described later.

Figure 4:
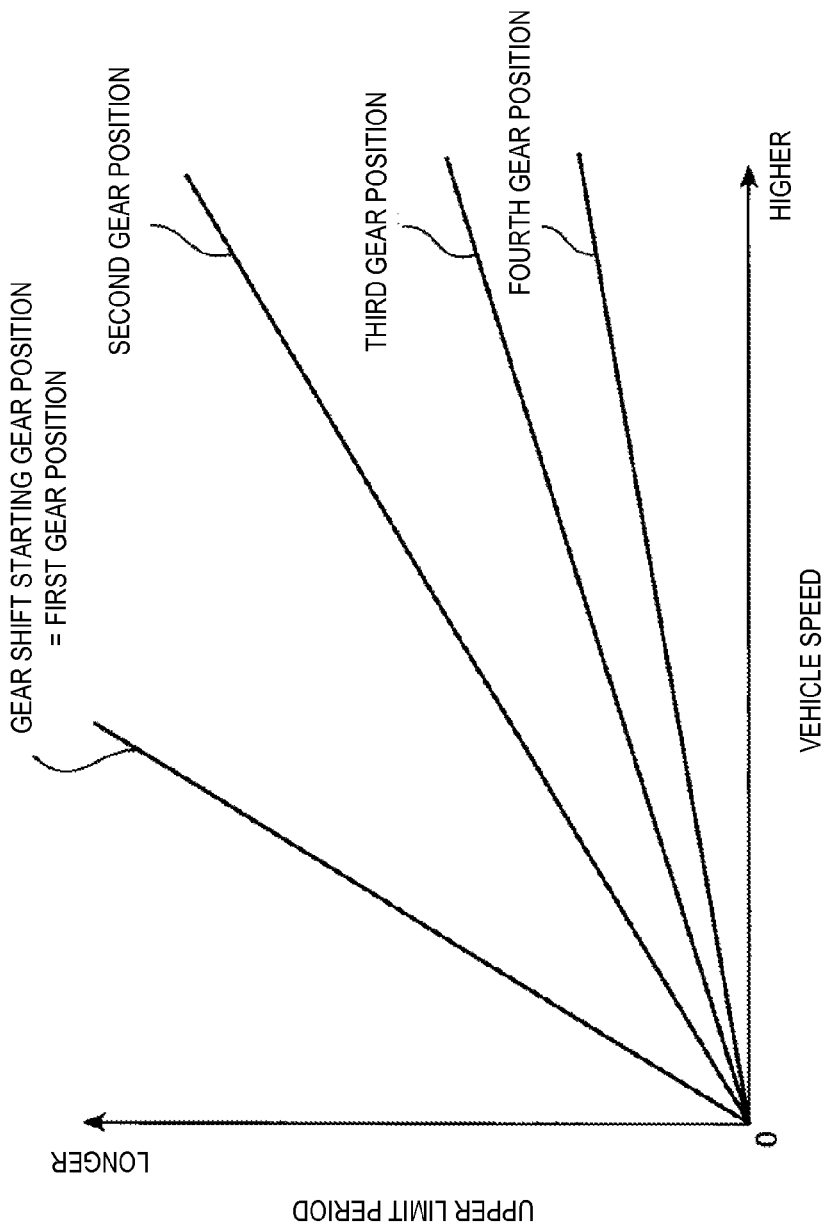
FIG. 4 is a chart illustrating an upper limit period (specific period) of an engine speed control.

The specific period designing module 54 specifies an upper limit length of a period in which the control of the engine speed is performed by the speed control module 55. In this embodiment, the specific period designing module 54 specifies the upper limit length of the period (upper limit period, specific period) to be longer as the gear shift starting vehicle speed becomes higher and the gear shift starting gear position becomes lower. Specifically, at each gear position, the specific period designing module 54 designs the upper limit period to be longer as the gear shift starting vehicle speed becomes higher, and when the vehicle speed is constant, the specific period designing module 54 designs the upper limit period to be longer as the gear shift starting gear position becomes lower. More specifically, as illustrated in FIG. 4, a map of the upper limit period designed with respect to the vehicle speed in a manner wherein the upper limit period becomes longer as the vehicle speed becomes higher is provided for each gear position and stored in the specific period designing module 54. The specific period designing module 54 extracts the upper limit period from one of the maps according to the vehicle speed and the gear position at the gear shift start timing.

(2-3) Flow of Shift Assist Control

Figure 5:
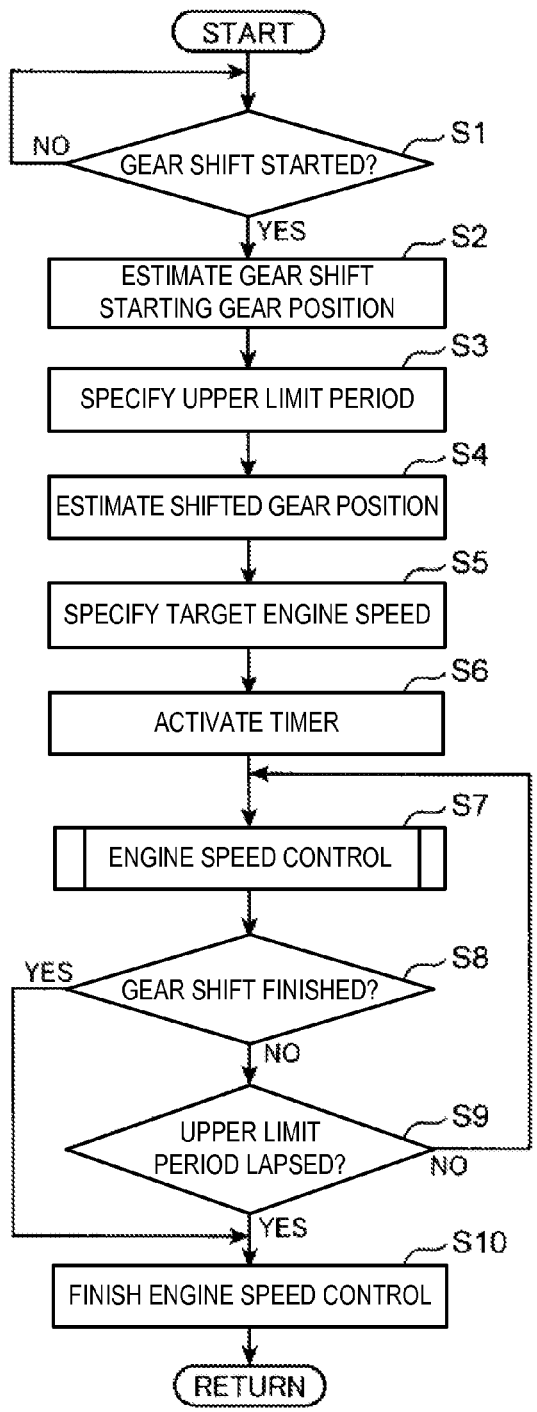
FIG. 5 is a flowchart illustrating a routine of a shift assist control.

A flow of the control performed by the modules 51 to 55 configured as above is described with reference to the flowchart in FIG. 5.

First, at S1, whether the gear shift has started is determined. As described above, this determination is performed by the transmission state determining module 51 based on the signal from the clutch switch SN3. The determination at S1 is repeated until the determination result becomes positive, in other words, the gear shift is determined to have started.

If the gear shift is determined to have started (S1: YES), at S2, the gear shift starting gear position is estimated. As described above, this estimation is performed by the gear position estimating module 52 based on the engine speed and the vehicle speed at the gear shift start timing.

Subsequently at S3, the upper limit period is specified. As described above, this specification is performed by the specific period designing module 54 based on the vehicle speed and the gear position at the gear shift start timing.

Next, at S4, the shifted gear position is estimated, and then, at S5, the target engine speed is specified. As described above, these estimations and specifications are performed by the target engine speed specifying module 53 in a manner wherein the gear position which is one level higher than the gear shift starting gear position estimated at S2 is set as the target gear position and the target engine speed is specified based on the target gear position and the gear shift starting vehicle speed.

Subsequently at S6, a timer is activated, in other words, a time measurement is started.

Then, at S7, the engine speed is controlled to the target engine speed. As described above, this control is performed by the speed control module 55. A specific routine of this control of the engine speed is described later.

Next, at S8, whether the gear shift has finished is determined. As described above, this determination is performed by the transmission state determining module 51 based on the signal from the clutch switch SN3.

If the gear shift is determined to have finished (S8: YES), the routine proceeds to S10, where the control of changing the engine speed to the target engine speed, namely the shift assist control, is stopped.

On the other hand, if the result of S8 is negative, the routine proceeds to S9. At S9, whether the timer activated at S6 indicates a time length which is longer than the upper limit period specified at S3, specifically, whether the upper limit period has lapsed since the control of forcibly changing the engine speed to the target engine speed was started, is determined. If the result of this determination is positive, the routine proceeds to S10, where the engine speed control is terminated. However, if the result of this determination is negative, the routine returns to S7 to repeat the process from S7. In other words, the engine speed control is performed until it is determined that the gear shift has finished (S8: YES) or it is determined that the upper limit period has lapsed since the control of forcibly changing the engine speed to the target engine speed was started (S9: YES).

Figure 6:
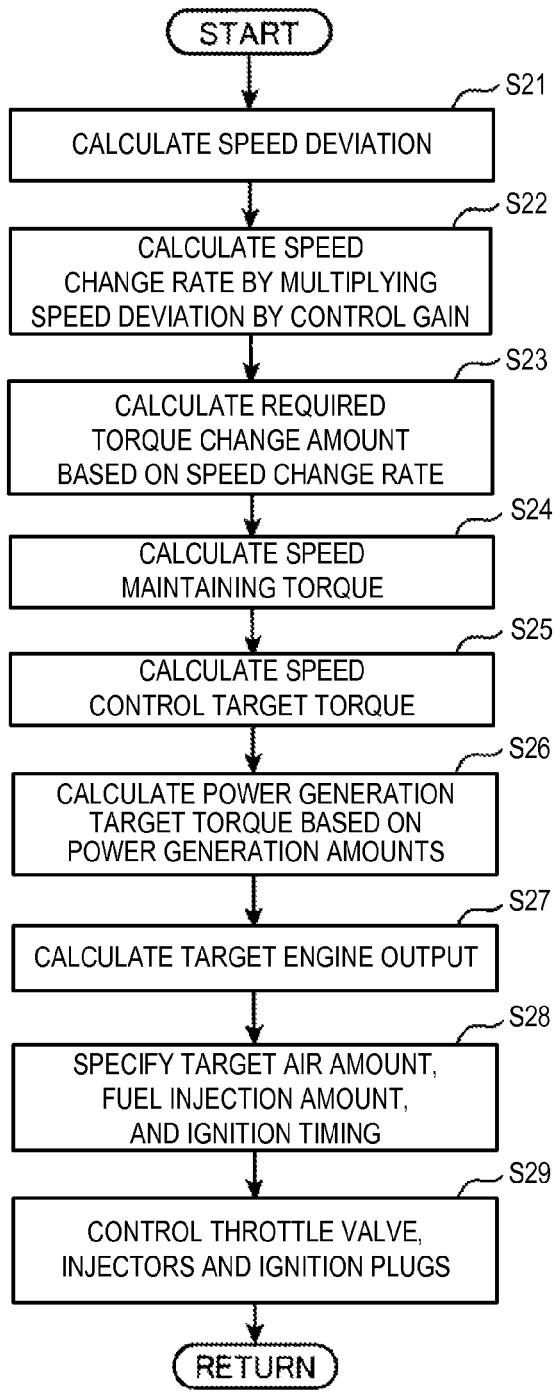
FIG. 6 is a flowchart illustrating a routine of the engine speed control.

Next, the routine of the engine speed control performed by the speed control module 55 at S7 is described in detail with reference to FIG. 6.

First at S21, the speed control module 55 calculates a deviation between the target engine speed specified by the target engine speed specifying module 53 at S4 and the actual engine speed, in other words, a speed deviation obtained by subtracting the actual engine speed from the target engine speed.

Subsequently at S22, a speed change rate corresponding to a value by which the engine speed is changed per unit time is set. The speed control module 55 calculates the speed change rate by multiplying the speed deviation calculated at S21 by a predetermined control gain.

At S23, the speed control module 55 calculates a change amount of a torque required for increasing the engine speed by the value corresponding to the speed change rate. Specifically, a map of the required torque change amount with respect to the speed change rate is stored in the speed control module 55, and the speed control module 55 extracts a value of the required torque change amount corresponding to the speed change rate set at S22 from the map.

Next, at S24, the speed control module 55 calculates a speed maintaining torque that is an engine torque required for maintaining a current engine speed. Specifically, a map of the speed maintaining torque with respect to the engine speed is stored in the speed control module 55, and the speed control module 55 extracts a value corresponding to the actual engine speed from the map.

Subsequently at S25, the speed control module 55 calculates a speed control target torque that is an engine torque required for changing the current engine torque by the required torque change amount calculated at S23 while maintaining the engine speed at the current value. Specifically, the speed control module 55 calculates the speed control target torque by adding the speed maintaining torque calculated at S24 to the required torque change amount calculated at S23.

Then, at S26, the speed control module 55 calculates a power generation target torque required for driving the alternator. The alternator is driven to generate requested power generation amounts from the various electric components, and the torque required to drive the alternator is specified based on the power generation amounts. In this embodiment, a map of the power generation amounts of the alternator and the engine torque required for causing the alternator to generate the power generation amounts is stored in the speed control module 55, and the speed control module 55 extracts a torque value corresponding to the power generation amounts from the map.

Next, at S27, the speed control module 55 calculates a target engine output. In this embodiment, the speed control module 55 calculates a final required torque by adding the power generation target torque calculated at S26 to the speed control target torque calculated at S25 to obtain a sum value and further adding, to the sum value, a mechanic resistance torque that is caused due to the rotation of the engine, and then the speed control module 55 calculates the target engine output by adding a pumping loss amount to an engine output required for obtaining the final required torque.

Next, at S28, the speed control module 55 specifies a target air amount and an ignition timing with which the target engine output can be achieved, based on the target engine output calculated at S27. Then the speed control module 55 specifies the opening of the throttle valve for supplying the specified target air amount to the engine 2. Moreover, the speed control module 55 specifies a fuel injection amount based on the target air amount.

Further, at S29, the speed control module 55 controls the throttle valve 25, the injectors 23, and the ignition plugs 29 to realize the throttle valve opening, the fuel injection amount, and the ignition timing specified at S28.

(3) Effects

As described above, in the vehicle to which the control device of the engine of this embodiment is applied, the target value of the engine speed is specified based on the gear shift starting gear position and the engine speed is controlled to the target value. Therefore, the difference between the rotational speed of the transmission and the speed of the engine when the gear shift has finished can be controlled to be small, and the occurrence of the shift shock caused by the speed difference can be reduced.

Moreover, in this vehicle, the engine speed control is stopped, not only when the gear shift has finished, but also when the predetermined period (upper limit period) has lapsed since the control of forcibly changing the engine speed has been started. Therefore, a situation where the vehicle operator feels uncomfortable can be avoided even more surely, by preventing the engine speed from changing differently from the vehicle operator's intension while reducing the occurrence of the shift shock which is caused due to the engine speed being different from the rotational speed of the transmission when the gear shift has finished.

Particularly in this embodiment, the upper limit period is designed to be longer as the vehicle speed is higher and the gear shift starting gear position is lower. Therefore, the shift shock can be reduced more surely while avoiding the situation where the vehicle operator feels uncomfortable.

Specifically, as is clear from FIG. 3 and Equation A, the reference synchronization speed increases in proportion to the vehicle speed at any gear position. Therefore, the difference in the reference synchronization speed between the gear positions, in other words the difference between the engine speed at the gear shift start timing and the engine speed synchronizing with the rotational speed of the transmission 5 when the gear shift has finished, becomes larger as the vehicle speed is higher. For example, a difference $\Delta NE\_12(1)$ in the reference synchronization speed between the first and second gear positions at a vehicle speed Vsp1 is larger than a difference $\Delta NE\_12(2)$ in the reference synchronization speed between the first and second gear positions at a vehicle speed Vsp2 that is lower than the vehicle speed Vsp1.

Moreover, in general vehicles, to secure higher acceleration performance for an operating range where the vehicle speed is higher and the acceleration performance is more easily degraded, the gear ratios are set to be closer, specifically the difference between the gear ratios of two adjacent gear positions (difference between the gear ratio of a certain gear position and the gear ratio of the gear position which is one level lower/higher than the certain gear position) is set to be smaller as the vehicle speed is higher. The difference in the reference synchronization speed between the adjacent gear positions is set to be smaller as the gear positions are higher at the same vehicle speed. In other words, in the example of FIG. 3, the differences of the reference synchronization speeds NE_1 to NE_5 of the gear positions at the vehicle speed Vsp1 from each other (differences between adjacent gear positions) which are denoted by $\Delta NE\_12(1)$ (a difference between the reference synchronization speed NE_1 of the first position and the reference synchronization speed NE_2 of the second position), $\Delta NE\_23$ (a difference between the reference synchronization speed NE_2 of the second position and the reference synchronization speed NE_3 of the third position), $\Delta NE\_34$ (a difference between the reference synchronization speed NE_3 of the third position and the reference synchronization speed NE_4 of the fourth position), and $\Delta NE\_45$ (a difference between the reference synchronization speed NE_4 of the fourth position and the reference synchronization speed NE_5 of the fifth position), respectively, become smaller in this order. Note that FIG. 3 illustrates a case where the gear ratios of the first to fifth gear positions are 3.6, 1.9, 1.2, 0.9, and 0.7, respectively.

Further, a required period of time for the engine speed to decrease to the speed synchronizing with the rotational speed of the transmission 5 when the gear shift has finished becomes longer as the difference between the gear positions is larger.

In this regard, in this embodiment, the upper limit period is designed to be longer and the time length for the engine speed control to be performed is ensured to be longer as the vehicle speed is higher and the gear shift starting gear position is lower. Therefore, the engine speed can be matched with the synchronization speed more surely and, thus, the shift shock can be reduced to be small.

(4) Modifications

In this embodiment, the case where the upper limit period is designed to be longer as the vehicle speed is higher and the gear shift starting gear position is lower is described; however, the upper limit period may be ensured to be longer as the vehicle speed is higher regardless of the gear position. Specifically, at any gear position, the upper limit period may be similarly designed to be longer according to the vehicle speed.

However, by designing the upper limit period to be longer as the vehicle speed is higher and the gear position is lower as described above, the upper limit period, specifically the period in which the engine speed control is performed, can more surely be ensured in correspondence with a required time length for the engine speed to change to the synchronization speed at the shifted gear position, and at the gear shift end timing, the engine speed can more surely be controlled to the speed synchronizing with the rotational speed of the transmission. Therefore, the shift shock can surely be reduced to be small.

Moreover, in this embodiment, the case where the shift assist control is performed only when shifting up is described; however, the shift assist control may be performed when shifting down. Note that in the case of performing the shift assist control when shifting down, the target engine speed specifying module estimates the shifted gear position at the gear position which is lower (e.g., lower by one level) than the gear shift starting gear position.

However, when shifting down, the engine speed needs to be increased and the vehicle operator performs a stepping operation on the accelerator. Therefore, the necessity of controlling the engine speed separately is low. Moreover, it is considered not preferable in terms of driving safety, to automatically increase the engine speed independently from the control by the vehicle operator. On the other hand, when shifting up, the mechanical resistance of the engine 2 is small. Therefore, the engine speed decreases slowly and, thus, there is a high possibility of causing the shift shock. For this reason, it is preferable to perform the shift assist control at least when shifting up as this embodiment.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

2 Engine
4 Clutch
5 Transmission
51 Transmission State Determining Module
52 Gear Position Estimating Module
53 Target Engine Speed Specifying Module
54 Specific Period Designing Module
55 Speed Control Module

What is claimed is:

1. An engine control device to be mounted on a vehicle, the vehicle including a stepped transmission, an engine, and a clutch for connecting the stepped transmission with the engine and disconnecting the stepped transmission from the engine, the control device comprising:
   a transmission state determining module for determining a connection between the stepped transmission and the engine, determining that a gear shift has started if the connection between the stepped transmission and the engine is disengaged from a connected state, and determining that the gear shift has finished if the connection between the stepped transmission and the engine is resumed;
   a gear position estimating module for estimating a gear position when the gear shift is determined to have started by the transmission state determining module;
   a target engine speed specifying module for specifying a target engine speed that synchronizes with a rotational speed of the stepped transmission when the gear shift has finished, based on the gear position estimated by the gear position estimating module; and
   a speed control module for controlling an engine speed to become the target engine speed when the gear shift is determined to have started by the transmission state determining module,
   wherein the speed control module stops a control of the engine speed when a specific period is lapsed since the transmission state determining module determines that the gear shift has started, and
   wherein the specific period is designed to be longer as a speed of the vehicle when the transmission state determining module determines that the gear shift has started is higher.

2. The control device of claim 1, wherein the specific period is designed to be longer as the gear position estimated by the gear position estimating module is lower, while a vehicle speed is constant.

3. The control device of claim 2, wherein the transmission is a manual transmission.

4. The control device of claim 3, wherein the control of the engine speed is performed only when shifting up.

5. The control device of claim 1, wherein the transmission is a manual transmission.

6. The control device of claim 1, wherein the control of the engine speed is performed only when shifting up.

7. An engine control device to be mounted on a vehicle, the vehicle including a stepped transmission, an engine, and a clutch for connecting the stepped transmission with the engine and disconnecting the stepped transmission from the engine, the control device comprising:
   a transmission state determining module for determining a connection between the stepped transmission and the engine, determining that a gear shift has started if the connection between the stepped transmission and the engine is disengaged from a connected state, and determining that the gear shift has finished if the connection between the stepped transmission and the engine is resumed;
   a gear position estimating module for estimating a gear position when the gear shift is determined to have started by the transmission state determining module;
   a target engine speed specifying module for specifying a target engine speed that synchronizes with a rotational speed of the stepped transmission when the gear shift has finished, based on the gear position estimated by the gear position estimating module; and
   a speed control module for controlling an engine speed to become the target engine speed when the gear shift is determined to have started by the transmission state determining module,
   wherein the speed control module stops a control of the engine speed when a specific period is lapsed since the transmission state determining module determines that the gear shift has started with the stepped transmission and the engine disengaged.

8. The control device of claim 7, wherein the transmission is a manual transmission.

9. The control device of claim 7, wherein the control of the engine speed is performed only when shifting up.

* * * * *